United States Patent [19]

Kuhlman

[11] 3,725,974
[45] Apr. 10, 1973

[54] MOLDABLE FOOD DEPOSITING APPARATUS

[76] Inventor: Harvey G. Kuhlman, 21466 Silver Spring Rd., Menomonee Falls, Wis.

[22] Filed: Apr. 27, 1970

[21] Appl. No.: 32,029

[52] U.S. Cl. ................................... 17/32, 99/450.1
[51] Int. Cl. ............................................... A22c 7/00
[58] Field of Search ................... 17/32; 107/1, 27, 107/52, 54, 15

[56] References Cited

UNITED STATES PATENTS

| | | | |
|---|---|---|---|
| 3,368,501 | 2/1968 | Kuhlman | 107/1 |
| 3,505,963 | 4/1970 | Westling | 107/54 |
| 3,296,655 | 1/1967 | Vidjak et al. | 17/32 |
| 3,461,820 | 8/1969 | Falco | 17/32 X |
| 3,545,386 | 12/1970 | Westling | 107/1 |
| 3,547,052 | 12/1970 | Artiaga | 107/54 |

Primary Examiner—Lucie H. Laudenslager
Attorney—Andrus, Sceales, Starke & Sawall

[57] ABSTRACT

A transfer plate having metering openings is slidably mounted between a pressurized meat source and a plurality of hollow transfer pins within which heaters are mounted. An air cylinder unit is coupled to momentarily jog the push bars, and a second fluid cylinder motor means is interconnected to the supporting bed to simultaneously jog the bed and then wipe the meat patties from the ends of the pins. Alternatively, an air chamber is mounted on top of the meat chamber connected by air tubes to bottom openings in the meat chamber. The metering plate selectively aligns the filled openings with the air tubes to positively force the patties onto the bases. The meat patties may also be transferred by rapidly moving the pins downwardly into engagement with a resilient means which stops the pins in spaced relation to the bases to cause the meat pattie to transfer under the inertia forces.

5 Claims, 6 Drawing Figures

PATENTED APR 10 1973 3,725,974

INVENTOR.
HARVEY G. KUHLMAN
BY
Andrus, Sceales, Starke, & Sawall
Attorneys

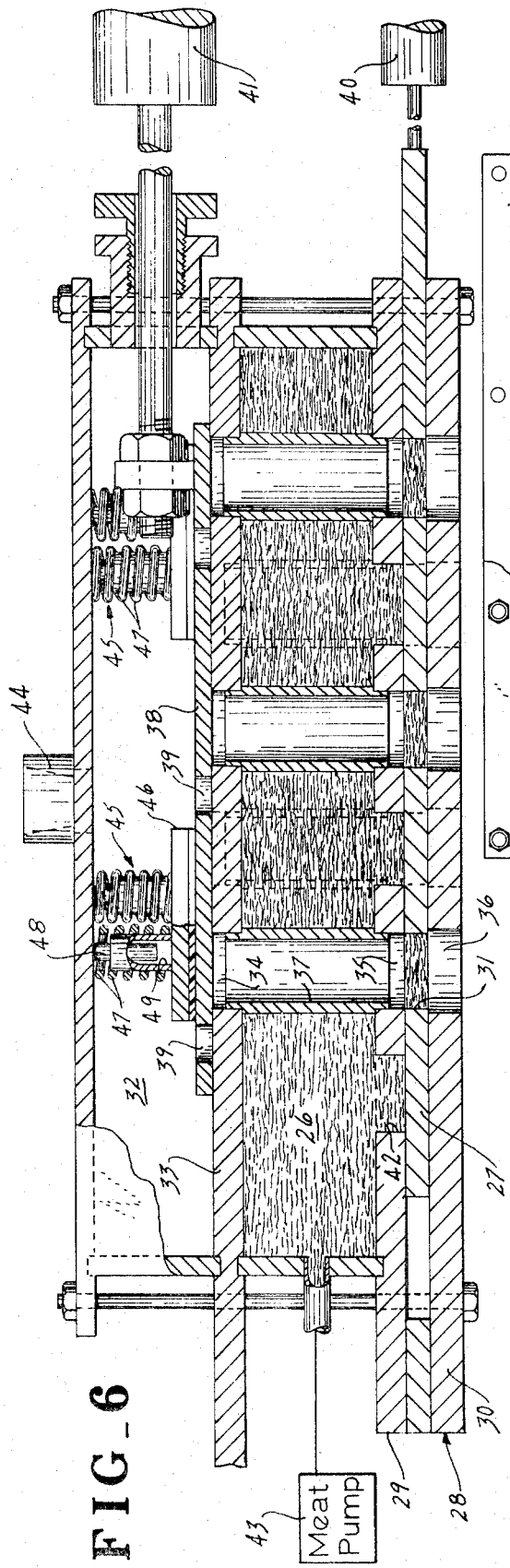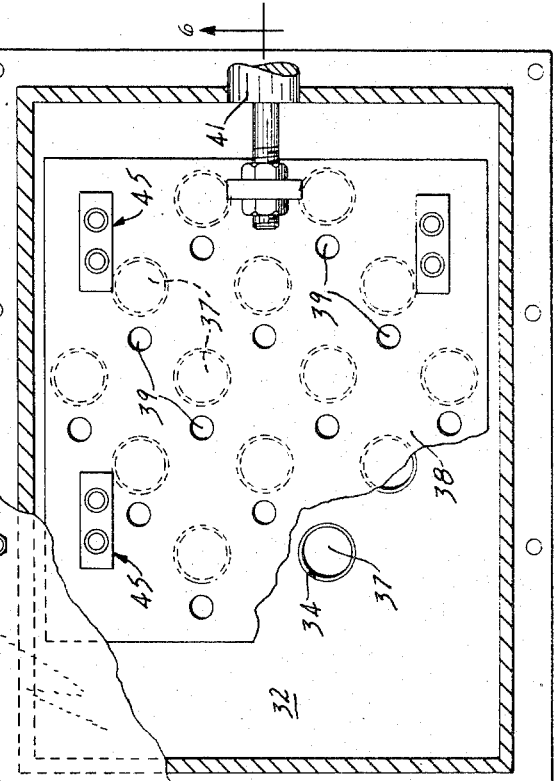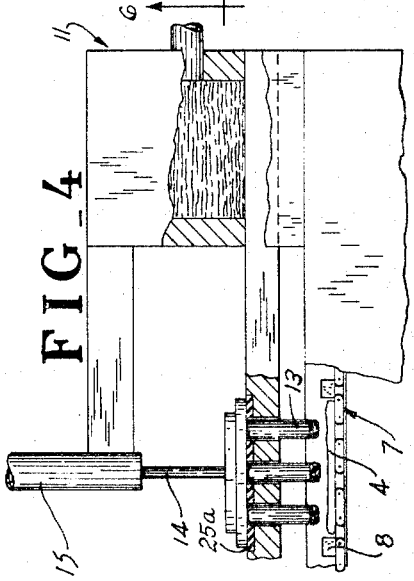

MOLDABLE FOOD DEPOSITING APPARATUS

BACKGROUND OF THE INVENTION

This invention relates to a moldable food depositing apparatus and particularly to an automatic means and apparatus for applying preselected amounts of meat in individual patties or the like upon a base member such as a pizza crust or base.

In mass marketing of a food product such as pizzas, the cost may be substantially reduced if a satisfactory, automatic food-forming and packaging system can be provided. A highly satisfactory system for automatic forming of pizzas and the like is disclosed in United States Pat. No. 3,368,501, which issued to Harvey G. Kuhlman on Feb. 13, 1968. The apparatus disclosed therein discloses means for automatically and sequentially applying a sauce, a shredded cheese and meat patties to pizza bases. The meat patties are applied through sequential transmission of the meat to openings within a transfer plate with the meat being removed through a plurality of depending fingers which extend downwardly and force the meat from the unit and onto the pizza bases. Although such apparatus provided satisfactory means for applying meat patties, depending upon the particular conditions encountered, such as temperature and the like, the meat may not remove from the applicator in a reliable and repeatable manner, particularly at high speed processing.

SUMMARY OF THE INVENTION

The present invention is particularly directed to an improved apparatus for the metering and depositing of meat to a pizza crust or the like. Generally, in accordance with the present invention, a transfer or metering plate is provided with metering openings. A meat source is coupled to the plate to fill the openings with the desired meat. In accordance with the present invention, the meat is transferred downwardly by a novel removing means onto the pizza bases with a forced application onto the bases and with means to positively separate the applied meat from the removing means. In one aspect of this invention, relative movement is established between the transfer plate and the conveying means with the applying force on the meat to establish a wiping action which positively transfers the meat patties to the pizza bases. This has been found to provide a highly improved and reliable means for transferring the meat to the pizza bases.

In accordance with a preferred construction, a fluid cylinder motor means is coupled to the main conveyor means to momentarily jog the conveyor means and thereby provide the wiping action. Further, where the pizza bases are pushed along a supporting bed, a second fluid cylinder motor means is interconnected to the supporting bed and simultaneously jogs the bed to improve the wiping action and insure transfer of the meat patties.

In accordance with one particularly novel construction of the present invention, the meat removal means includes a plurality of depending removal pin means within which electrical or other suitable heating means are provided. The pin means, including the lower ends, are held at a satisfactory temperature level to positively insure removal of the meat without adversely affecting the characteristic of the meat. Further, the transfer plate is preferably slidably mounted within a pressurized meat source with the meat applied to fill the openings within the plate by a positive displacement pump or the like.

In an alternative construction and novel aspect of the invention, the removal means includes a means to apply a fluid column of air or other suitable fluid upon the meat patties within the openings to positively force them downwardly onto the aligned bases. This positively forces the patties onto the bases, and by movement of the bases, may also establish a wiping action to insure complete application onto the bases. In a particularly unique construction, the applicator includes a meat chamber with the metering plate forming a part of the lower wall of the chamber and an air chamber immediately above the meat chamber. A plurality of air conduits extend through the meat chamber and connect openings in the top and bottom walls of the meat chamber. The metering plate is slidably mounted adjacent the bottom wall and selectively aligned with the conduit openings and with the meat chamber. An air valve plate is slidably mounted adjacent the top wall of the meat chamber. The metering plate and valve plate are synchronously moved to selectively align the plate opening with the conduit for controlled transfer of meat patties onto the bases as the bases are aligned with the openings.

The present invention has thus been found to provide a highly satisfactory and reliable means for the rapid and reliable transfer of meat patties and the like in accurately metered amounts to base members such as pizza crusts and the like.

BRIEF DESCRIPTION OF THE DRAWINGS

The drawings furnished herewith illustrate the best mode presently contemplated by the inventor for carrying out the subject invention in which the above advantages and features are clearly disclosed, as well as others which will be readily and fully understood from the following description of the illustrated embodiment.

In the drawings:

FIG. 4 is a fragmentary view similar to FIG. 3, showing an alternative method of positively removing the meat pattie from the meat applicator;

FIG. 5 is a fragmentary top view showing an alternative construction in accordance with the teaching of this invention for positively applying meat patties to a base; and FIG. 6 is an enlarged view taken generally on lines 6—6 of FIG. 5.

DESCRIPTION OF ILLUSTRATED EMBODIMENT

Figure 1:
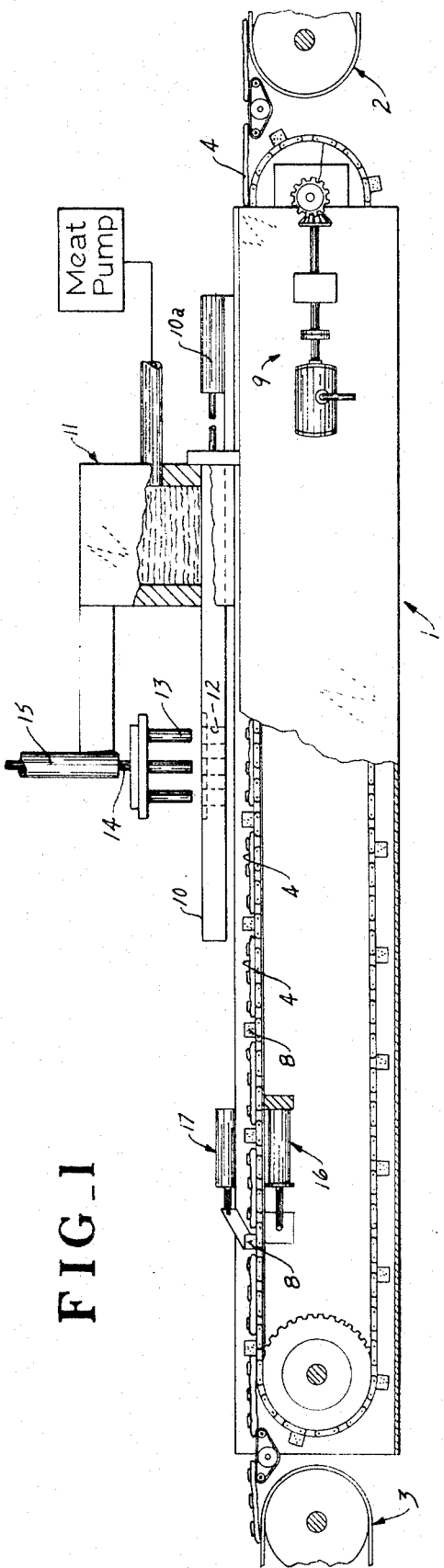
FIG. 1 is an enlarged side elevational view, partly in section, illustrating the construction of a meat applicator in accordance with the present invention.
Figure 2:
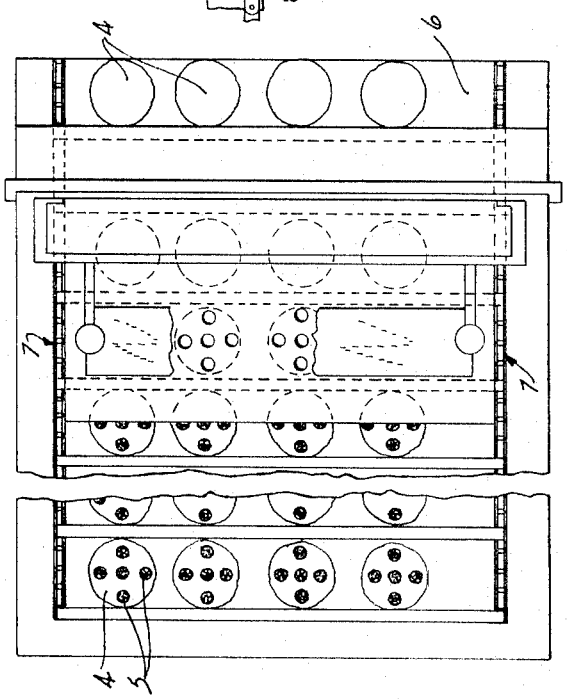
FIG. 2 is a top plan view of the apparatus shown in FIG. 1.

Referring to the drawings and particularly to FIGS. 1 and 2, a meat applicator 1 is shown centrally located between an infeed conveying belt 2 and an outfeed or discharge conveying belt 3 for transferring pluralities of aligned rows of pizza bases 4 through the meat applicator 1. Although shown in FIG. 2 with a width sufficient to simultaneously carry a plurality of pizza bases 4 in side-by-side relation, the apparatus can be constructed to sequentially carry single pizza bases through the apparatus or enlarged to carry additional pizza bases, as desired. Generally, the pizza bases 4, as fed to the meat applicator, may have had sauce and shredded cheese, not shown, applied thereto in any suitable manner, for example, as shown in applicant's copending application entitled Food Applicator, and filed on the same day as the present invention. In passing through the meat applicator 1, a plurality of meat patties 5 are applied to the pizza base 4.

Figure 3:
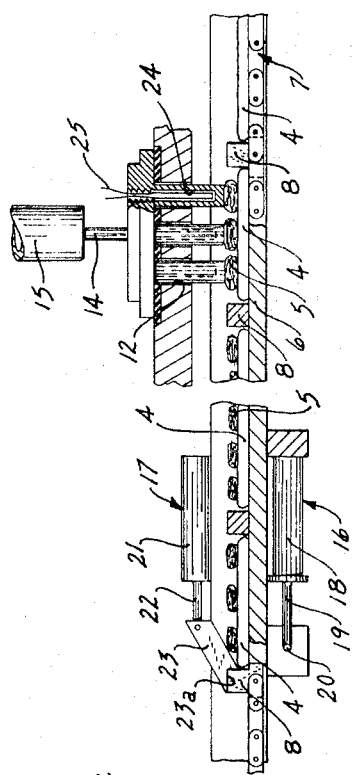
FIG. 3 is an enlarged vertical section through a part of a meat-removing element shown in elevation in FIG. 1.

Generally, in the illustrated embodiment of the invention shown in FIGS. 1-3, the meat applicator 1 includes a stainless steel support bed 6 for supporting of the bases 4 as they pass through the meat applicator. A pair of conveyor chains 7 are mounted one each to the opposite sides of the applicator and a plurality of longitudinally spaced push elements in the form of bars 8 are secured thereto. The bars 8 span the bed and project upwardly to define locating and engaging walls for carrying or pushing of the bases in lateral alignment along the bed through the applicator 1. The conveyor chains 7 are coupled to a suitable drive such as an electric motor driven clutch and brake assembly 9, which may suitably include a motor driving a clutch and brake unit which is coupled to a chain sprocket drive by a suitable gear reducer unit. Assembly 9 is operated to establish a stepped movement of the pizza bases 4. The row of pizza bases 4 are thereby accurately aligned with and beneath a transfer or metering plate 10. An air cylinder unit 10a is coupled to the transfer plate 10 which is reciprocally mounted for movement into and from a pressurized meat source 11 to sequentially have meat applied to metering openings 12 in the plate similar to the structure shown in the Kuhlman patent. A plurality of removing pins 13 are supported by a common bracket or support member 14 secured to the piston of a piston-cylinder motor unit 15. The pins 13 are arranged to be aligned with the openings of the transfer plate 10 when the plate openings are positioned from the source 11. Actuation of the cylinder unit 15 causes the pins 13 to move downwardly and thereby positively drive the patties of meat 5 from the openings 12 downwardly into surface engagement with the bases 4. As most clearly shown in FIG. 3, the pins 13 are of a sufficient length to slightly compress the meat pattie 5 against the base 4 and to clamp them in position.

The positive engagement and removal from the pins 13 is augmented through establishing a rapid jogging movement of the bases 4 relative to the pins 13. A bed jog cylinder unit 16 is coupled to the bed and provides a momentary rapid reciprocation thereof. Simultaneously therewith, a conveyor jog cylinder unit 17 is actuated to rapidly move the conveyor bars 8 forwardly and thereby wipe the meat 5 on the pizza bases 4 from the ends of the transfer pins 13.

In the illustrated embodiment of the invention, the hydraulic cylinder unit 16 is mounted to the underside of the bed 6 and includes a cylinder 18 which is fixed to the one side of the supporting bed structure. A piston shaft 19 extends outwardly from the cylinder with the outer end of the piston shaft interconnected through a pivotal coupling 20 to the bed plate 6.

The conveyor jog cylinder unit 17 is mounted to the top side of the chains 7 and the bars 8 with a cylinder 21 supported to the one side of the side frame structure of the meat applicator. The piston shaft 22 of the cylinder 21 extends outwardly and forwardly with an outer extension 23 pivotally connected to shaft 22. The outer end of the extension is notched as at 23a to permit selective engagement with the backside of a transfer bar 8. Thus, with the base 4 aligned with the transfer openings 12 and transfer pins 13, the notch 23a is aligned with and engages the backside of a transfer bar 8.

At that time, both of the cylinders 18 and 21 are momentarily energized to provide corresponding rapid forward drive motion on the bed 6 and the transfer bars 8 to provide slight rapid forward movement of the pizza bases 4 relative to the transfer pins 13. The simultaneous movement of the bed 6 and bars 8 eliminates any tendency for the bases to buckle as a result of the rapid forward force applied by bars 8. This results in a positive wiping action and a very satisfactory and rapid removal of the meat patties 5 from the transfer elements or pins 13 to the pizza crusts or bases 4.

The hydraulic cylinder units 16 and 17 are, of course, extended and retracted to complete the jogging action. The bed 6 returns to the initial starting position. The notched construction of the piston shaft extension 23 permits disengagement of the bar 8 and allows retraction thereof without return movement of the conveyor means. The pizza bases 4 are stepped forwardly through the operation of the electric clutch and brake unit to align the next row of bases 4. In this manner, the pizza bases 4 are stepped through the apparatus to accurately apply the metered amounts of the meat with a very rapid relative movement established through the hydraulic cylinder units to maintain the desired improved wiping action.

The transfer openings 12 permit very accurate metering of the amount of each meat pattie 5 while holding of the pattie by pin 13, with the wiping, resulting from the momentary rapid movement of the bases relative to the pins, provides a highly improved transfer method.

In the illustrated embodiment of the invention and as most clearly shown in FIG. 3, the several transfer elements or pins 13 are hollow cylinder members of a suitable metal, such as stainless steel or the like. Within each of the pins 13, a small electrical heater 24, having power leads 25 connected to a suitable power source, is mounted in good thermal interchange with the walls of the fingers to maintain them, and particularly the lower ends, at a predetermined transfer temperature. This assists in the reliable and rapid removal of the meat patties 5 from the openings 12 without adversely affecting the meat. The location of the electrical heating unit 24 within the pins 13 has been found to advantageously maintain the lower ends of the pins at an accurately controlled temperature to insure complete removal of the meat pattie 5.

An alternative means of positively forcing the meat patties 5 from the metering openings 12 and the pins 13 is shown in FIG. 4. As the structure is essentially the same, corresponding elements are identified by corresponding numbers for simplicity and clarity of explanation.

In FIGS. 3 and 4, a cushion means shown in the form of a resilient rubber pad 25a is provided in the upper wall of the metering plate 10. The plate 10 is set such that the pin 13, with the pattie 5 thereon, remains spaced from the base 4 to prevent actual clamping of a pattie 5, as in FIGS. 1–3. To positively transfer the pattie 5, the cylinder 15 is actuated to rapidly force the pin assembly toward the plate 10 such that the support member 14 engages the resilient pad 25a with a substantial velocity. The pin assembly will rapidly stop such that the meat pattie 5 on the end moves under inertia force from pin 13 onto the base 4.

An alternative construction for forming the meat into patties and transferring the patties onto the pizza bases 4 is shown in FIGS. 5 and 6 wherein the meat patties are transferred by air columns. In FIGS. 5 and 6, a transfer structure for applying meat patties to one base 4 is shown. The structure would, of course, be duplicated and mounted across the conveying means for applying the meat patties to a row of bases 4. Thus, referring particularly to FIGS. 5 and 6, an essentially closed meat chamber 26 is provided having a metering plate 27 slidably mounted as a part of the bottom wall 28. The bottom wall 28 is provided with an upper plate 29 and a lower spaced plate 30 between which the metering plate 27 is slidably mounted. The plate 27 includes a plurality of distributed metering openings 31 in accordance with the desired distribution of patties 5 and bases 4.

An air chamber 32 is formed immediately above the meat chamber 26 with a common wall 33 therebetween. The common wall 33 and bottom wall plates 29 and 30 are correspondingly apertured as at 34, 35 and 36 in accordance with the apertures or openings 31 in the metering plate 27. Suitable conduits or pipes 37 are sealed within the respective aligned openings in the upper wall 33 and the upper plate 29 of the bottom wall to maintain the essential closure of the meat chamber 26. This provides, however, for communication from the air chamber 32 to the metering plate 27 such that when the metering openings 31, each filled with a meat pattie, are aligned with the air passage conduit 37, air can move downwardly to force the patties 5 from the openings 31 and onto an aligned pizza base 4.

An air valve plate 38 is slidably mounted adjacent the top of the common wall 33 and includes valve openings 39 to selectively connect the passageways defined by conduits 37 to the air chamber 32 and thereby provide for the selected application of air pressure.

In the illustrated embodiment of the invention, similar air cylinder units 40 and 41 are provided and interconnected respectively to the metering plate 27 and the air valve plate 38. The cylinders 40 and 41 are actuated in timed relation to correspondingly position the air valve plate 38 and the metering plate 27.

More particularly, the meat metering plate 37 is constructed with the openings 31 distributed within the plate in accordance with the distribution of the desired meat patties 5 on the pizza base 4. The air passageways 37 are similarly distributed within the structure. For example, a typical distribution is shown by the openings in FIG. 5. Thus, the meat patties are distributed in a plurality of rows, each of which includes a different number of the patties and in which the patties are spaced from each other by a distance greater than the size of the patties. In accordance with the present invention, the metering plate 27 is shifted by actuation of the air cylinder 40 from the air passageways to locate the metering openings 31 intermediate the air passageways 37 and in alignment with transfer openings 42 in the upper plate 29 of the meat chamber bottom wall 28.

The meat chamber 28 is connected to a positive displacement pump 43 or other suitable source to maintain the meat chamber 28 filled with the desired meat and under a positive pressure such that with the metering plate 27 located to align the metering openings 31 with the transfer openings 42, meat is forced downwardly under a predetermined pressure into the metering openings 31. When the metering plate 27 is shifted back to the discharge position, a very accurate metered amount of meat is held within the opening 31. The openings 35 and 36 in the upper and lower plates 29 and 30 of the bottom wall 28 are somewhat larger than the metering openings 31. However, the meat will inherently be retained within opening 31 due to the interaction between the side walls and the meat. Patties 5 are thus held within the opening 31 until an air column is applied to the upper end through the air passageways 37 to positively drive the meat patties 5 downwardly onto the pizza base 4.

In the illustrated embodiment of the invention, the air chamber 32 generally corresponds to and overlies the meat chamber 26. The upper wall of the air chamber 32 is connected to a suitable air inlet 44 to establish a predetermined constant air pressure within the chamber 32.

The air valve plate 38 is provided with the plurality of openings 39 somewhat smaller than the passageways 37 and selectively positioned with the openings 39 in alignment with the passageways 37 or shifted therefrom such that a continuous portion of the plate 38 covers the openings to seal them. The air valve plate 38 is held in pressure-sliding engagement by a plurality of similar pressure units 45 distributed throughout the air chamber and bearing on the top side of the sliding valve plate 38. As each is identically constructed, a single unit is described.

The pressure unit 45 includes a pressure bar 46 having a Teflon undersurface slidably bearing on the plate 38 to permit establishment of a relatively firm downward pressure on the air valve plate 38 without interfering with the movement thereof.

The pressure bars 46 are biased into engagement with the valve plate 38 by a pair of coil springs 47 acting between the underside of the top wall of the air chamber 32 and the back or top surface of the pressure bar 46. Suitable guide pins 48 are secured to the top wall of the air chamber 32 and project downwardly into guide cylinders 49 attached to the pressure plate. The pressure springs 47 encircle the guide assembly to maintain the springs between the pressure plate and the chamber wall.

In summary, the embodiment of the invention illustrated in FIGS. 5 and 6 provides for the timed energization of the operating air cylinder units 40 and 41 coupled to the metering plate 27 and the valve plate 38 in predetermined timed relationship with respect to the movement of the pizza bases 4 into alignment with the transfer openings 36. A row of pizza bases 4 will be stepped into alignment to receive the meat. The metering plate 27 is positioned with the transfer openings 31 aligned with the air passageways 37 and the air valve plate 38 is then positioned with valve openings 39 aligned with the air passageways. This will result in direct transfer of the meat patties under the column of air pressure transmitted through the passageways 37. The patties 5 are thereby positively driven downwardly onto the pizza bases 4. The air valve plate 38 is then positioned to close the air passageways and remove pressure from the passageways 37. The metering plate 27 is then returned to align the metering openings 31 with the filling openings 42 to refill the metering openings 31 in the same manner as previously described. During this period, the filled pizza bases 4 are stepped forwardly and a new row of pizza bases 4 are aligned with the transfer openings 36 in plate 30.

Although particularly described in connection with substantial meat patties, the metering plate 27 may be formed with a very substantial number of closely spaced openings to transfer the meat as a widely dispersed, granulated meat which essentially completely covers the pizza base, similar to the present hand application of ground meat. The meat may be wholly or partially cooked to form a granulated form of meat for convenient transfer.

The air transfer means thus provides another means of insuring positive application of the meat patties to the pizza bases in an accurately metered manner.

The present invention thus provides a forced application of the metered amount of meat or other food product to the base member and particularly provides a highly practical and reliable means for mass production of pizza units.

Various modes of carrying out the invention are contemplated as being within the scope of the following claims which particularly point out and distinctly claim the subject matter which is regarded as the invention.

I claim:

1. A food depositing apparatus to apply predetermined amounts of food patties to a base, comprising conveying means for supporting said base, depositing means to apply at least one pattie to said base and including force means to positively force each pattie onto said base, said force means including holding means to compress each pattie onto said base and including transfer means to establish rapid longitudinal movement between said base and said holding means to establish a wiping of the pattie onto said base.

2. The apparatus of claim 1 wherein said conveying means includes a supporting bed beneath said depositing means for supporting said base and a crossbar to push the base across the bed, and said transfer means establishes a momentary rapid longitudinal movement of the bed and crossbar to wipe the pattie from said depositing means.

3. The apparatus of claim 2, having a reciprocating means releasably coupled to said crossbars, a second reciprocating means connected to said bed, and means to simultaneously actuate both of said reciprocating means to rapidly move said bars and bed.

4. The apparatus of claim 1, wherein said conveying means includes a supporting bed, a plurality of longitudinally spaced crossbars extending across said bed and coupled to a rotating means to successively move the bars over the top of the bed to successively move the rows of pizza bases, said depositing means including a multiple pattie metering plate having a plurality of openings, each of said openings being selected to accommodate a single cylindrical pattie, said holding means including transfer elements aligned with said openings to simultaneously force said patties downwardly onto an aligned base and to compress said patties downwardly onto an aligned base, a first fluid cylinder means coupled to said crossbars, a second fluid cylinder means coupled to said bed, and said transfer means actuating both of said cylinder means to rapidly move said bars and bed and the pizza bases carried thereby to wipe the compressed patties from said elements onto said pizza bases, and means to intermittently drive said conveying means to sequentially align rows of pizza bases with said openings.

5. The apparatus of claim 1, wherein said depositing means including a multiple pattie transfer plate having a plurality of openings, each of said openings being selected to accommodate a single pattie as an elongated upstanding cylinder, said holding means including transfer pin members aligned with said opening to simultaneously force said patties downwardly onto an aligned base and to compress said cylinder onto the base, each of said pin members being a hollow member, a heating element within each of said pin members to raise the temperature of the pin members including the pattie-engaging ends to a selected temperature to prevent adverse sticking of the food to the pin members.

* * * * *